US012793259B2

(12) United States Patent
Konta et al.

(10) Patent No.: US 12,793,259 B2
(45) Date of Patent: Nov. 10, 2026

(54) METHOD OF MEASURING DROPLET AND DROPLET MEASUREMENT SYSTEM

(71) Applicant: Samsung Display Co., Ltd., Yongin-Si (KR)

(72) Inventors: Yu Konta, Yongin-si (KR); Laeho Kim, Yongin-si (KR); Jae Bum Pahk, Yongin-si (KR); Minwoo Lee, Yongin-si (KR); Hyeonseon Jeong, Yongin-si (KR); Jaihyuk Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 176 days.

(21) Appl. No.: 18/627,120

(22) Filed: Apr. 4, 2024

(65) Prior Publication Data

US 2024/0428442 A1 Dec. 26, 2024

(30) Foreign Application Priority Data

Jun. 26, 2023 (KR) ........................ 10-2023-0081548

(51) Int. Cl.

| | |
|---|---|
| ***G06K 9/00*** | (2022.01) |
| ***G06T 7/00*** | (2017.01) |
| ***G06T 7/13*** | (2017.01) |
| ***G06T 7/73*** | (2017.01) |

(52) U.S. Cl.

CPC ................ *G06T 7/73* (2017.01); *G06T 7/001* (2013.01); *G06T 7/13* (2017.01); *G06T 2207/30108* (2013.01)

(58) Field of Classification Search

CPC . G06T 2207/30108; G06T 7/001; G06T 7/13; G06T 7/62; G06T 7/73

See application file for complete search history.

(56) References Cited

U.S. PATENT DOCUMENTS

| | | | | |
|---|---|---|---|---|
| 2013/0308018 A1* | 11/2013 | Sasaki | H04N 25/611 | 382/167 |
| 2015/0373305 A1* | 12/2015 | Hauf | G06T 7/0004 | 118/712 |
| 2024/0367433 A1* | 11/2024 | Konta | G01B 11/0608 | |

FOREIGN PATENT DOCUMENTS

| | | |
|---|---|---|
| JP | 5384308 B2 | 1/2014 |
| JP | 6189102 B2 | 8/2017 |

OTHER PUBLICATIONS

Saylor, J. R., B. K. Jones, and L. F. Bliven. "A method for increasing depth of field during droplet imaging." Review of scientific instruments 73.6 (2002): 2422-2427. (Year: 2002).*

* cited by examiner

*Primary Examiner* — Hadi Akhavannik

(74) *Attorney, Agent, or Firm* — Innovation Counsel LLP

(57) ABSTRACT

A method of measuring a droplet is disclosed that includes discharging a droplet onto a substrate, imaging the droplet with a measurement part spaced apart from the droplet in one direction, measuring a distance between the droplet and the measurement part, and correcting an area of the droplet.

16 Claims, 8 Drawing Sheets

METHOD OF MEASURING DROPLET AND DROPLET MEASUREMENT SYSTEM

CROSS-REFERENCE TO RELATED APPLICATION(S)

This application claims priority under 35 USC § 119 to Korean Patent Application No. 10-2023-0081548 filed on Jun. 26, 2023, in the Korean Intellectual Property Office (KIPO), the entire disclosure of which is incorporated by reference herein.

BACKGROUND

1. Field

The present disclosure relates to a method of measuring a droplet and a droplet measurement system.

2. Description of the Related Art

In a process of manufacturing a display device, an inkjet printing device may be used to form a light emitting layer, a color filter layer, or the like.

The inkjet printing device may include an inkjet head, and the inkjet head may discharge organic material, color filter material, insulating material, or the like through a nozzle. In this case, the inkjet printing device may perform printing by discharging a droplet from the nozzle of the inkjet head toward an object while changing relative positions of the inkjet head and the object.

SUMMARY

Embodiments may provide a method of measuring a droplet with improved reliability.

Embodiments may provide a droplet measurement system using the method of measuring the droplet.

An embodiment of a method of measuring a droplet includes discharging a droplet onto a substrate, imaging the droplet with a measurement part spaced apart from the droplet in one direction, measuring a distance between the droplet and the measurement part, and correcting an area of the droplet.

In an embodiment, the measuring of the distance between the droplet and the measurement part may include measuring a distance in which the droplet deviates from a focal position of the measurement part.

In an embodiment, the measuring of the distance in which the droplet deviates from the focal position of the measurement part may include determining a grayscale change of an edge part of a first image of the droplet imaged by the measurement part.

In an embodiment, in the determining of the grayscale change of the edge part of the first image of the droplet imaged by the measurement part, the grayscale change of the edge part of the first image may be compared with a grayscale change of an edge part of a second image of the droplet imaged by the measurement part at the focal position.

In an embodiment, as the droplet deviates from the focal position of the measurement part, a width of the grayscale change of the edge part of the first image may increase.

In an embodiment, the measuring of the distance between the droplet and the measurement part may further include measuring a direction in which the droplet deviates from the focal position of the measurement part.

In an embodiment, the measuring of the direction in which the droplet deviates from the focal position of the measurement part may include determining a grayscale of a feature point of the first image of the droplet.

In an embodiment, wherein in the determining of the grayscale of the feature point of the first image of the droplet, the grayscale of the feature point of the first image may be compared with a grayscale of a feature point of the second image.

In an embodiment, the feature point may be a part of the edge part of the first image.

In an embodiment, the feature point may be a part of a central part of the first image.

In an embodiment, the measuring of the distance between the droplet and the measurement part may further include measuring an area of the first image of the droplet.

In an embodiment, in the measuring of the area of the first image of the droplet, the area of the first image may be compared with an area of the second image.

In an embodiment, in the correcting of the area of the droplet, an area of the first image may be corrected to an actual area of the droplet based on the distance in which the droplet deviates from the focal position of the measurement part and the direction in which the droplet deviates from the focal position of the measurement part.

In an embodiment, the method may further include evaluating a discharge amount of the droplet based on the actual area of the droplet.

In an embodiment, the method may further include feedback controlling the focal position of the measurement part based on the distance in which the droplet deviates from the focal position of the measurement part and the direction in which the droplet deviates from the focal position of the measurement part.

An embodiment of a droplet measurement system includes an inkjet head that discharges a droplet onto a substrate, a measurement part spaced apart from the droplet in one direction and that images the droplet, and a correction part that measures a distance between the droplet and the measurement part and corrects an area of the droplet imaged by the measurement part.

In an embodiment, the correction part may measure the distance between the droplet and the measurement part based on the area of the droplet imaged by the measurement part, a distance in which the droplet deviates from a focal position of the measurement part, and a direction in which the droplet deviates from the focal position of the measurement part.

In an embodiment, the correction part may measure the distance in which the droplet deviates from the focal position of the measurement part based on a grayscale change of an edge part of the droplet imaged by the measurement part.

In an embodiment, the correction part may measure the direction in which the droplet deviates from the focal position of the measurement part based on a grayscale of a feature point of the droplet imaged by the measurement part.

In an embodiment, the droplet measurement system may further include a control part that feedback controls a focal position of the measurement part based on the distance between the droplet and the measurement part.

In a method of measuring a droplet according to embodiments of the present disclosure, an area of a droplet imaged by a measurement part may be corrected to an actual area of the droplet based on a distance in which the droplet deviates from a focal position of the measurement part and a direction in which the droplet deviates from the focal position of the measurement part. Accordingly, even if the droplet deviates from the focal position of the measurement part, an error between the imaged area of the droplet and the actual area of the droplet may be automatically corrected, so that a discharge amount of the droplet may be evaluated based on the actual area of the droplet. Therefore, even if an upper surface of a target substrate on which the droplet is seated is not flat, the discharge amount of the droplet may be controlled to be uniform, so that a quality of a product including the droplet may be improved.

DETAILED DESCRIPTION OF THE EMBODIMENTS

Figure 1:
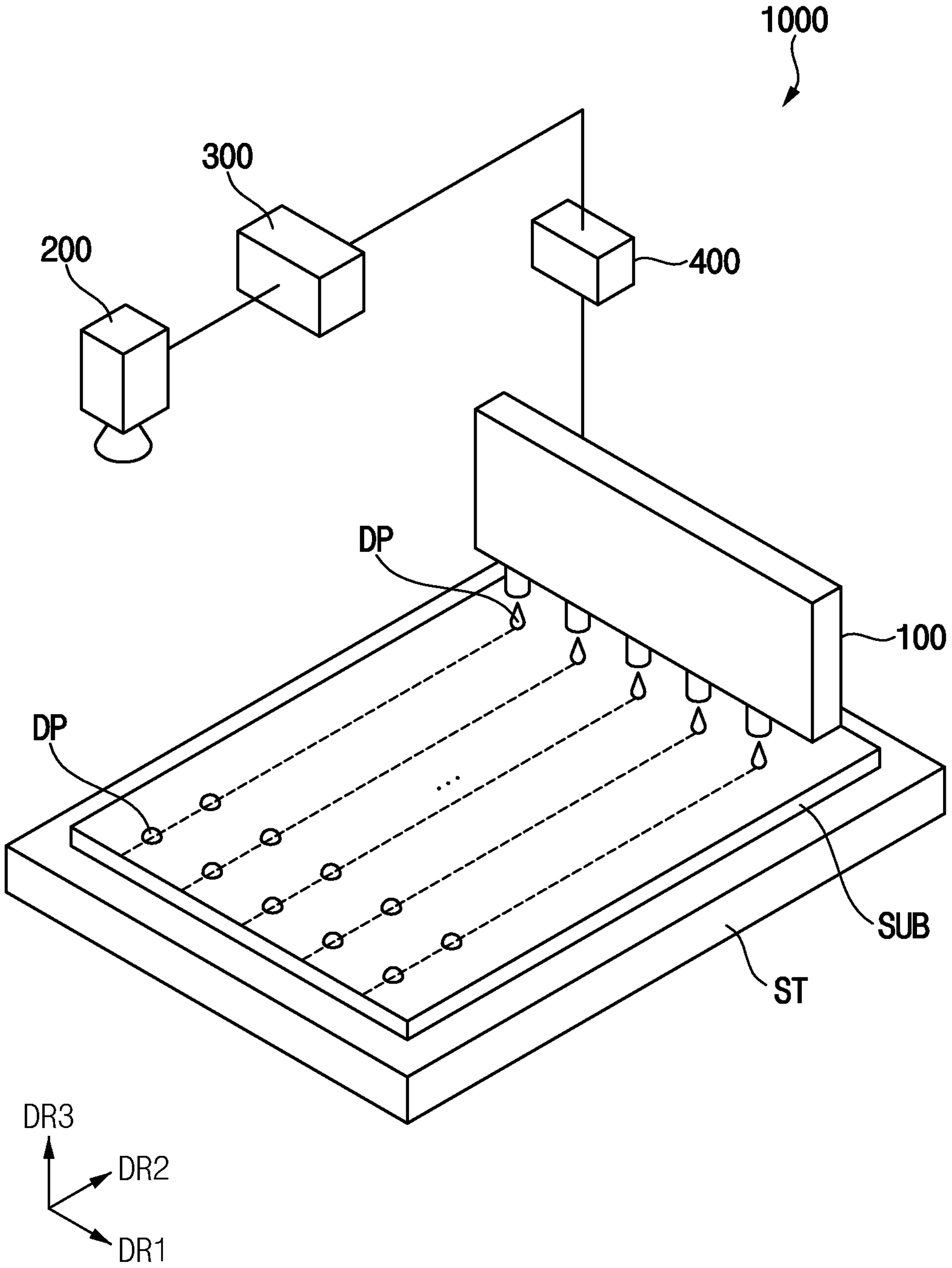
FIG. 1 is a perspective view illustrating a droplet measurement system according to an embodiment of the present disclosure.

Hereinafter, embodiments of the present disclosure will be described in more detail with reference to the accompanying drawings. The same reference numerals are used for the same components in the drawings, and redundant descriptions of the same components will be omitted.

FIG. 1 is a perspective view illustrating a droplet measurement system according to an embodiment of the present disclosure.

Referring to FIG. 1, a droplet measurement system 1000 may include a stage ST, an inkjet head 100, a measurement part 200, a correction part 300, and a control part 400.

The stage ST may be parallel to a plane defined by a first direction DR1 and a second direction DR2 intersecting the first direction DR1. For example, the first direction DR1 and the second direction DR2 may be perpendicular to each other.

The stage ST may support a target substrate SUB. A droplet DP may be seated on the target substrate SUB to form a pattern. An upper surface of the target substrate SUB on which the droplet DP is seated may not be flat. For example, the target substrate SUB may be a substrate or a film. The inkjet head 100 may be spaced apart from the stage ST in a third direction DR3 intersecting each of the first direction DR1 and the second direction DR2. For example, the third direction DR3 may be perpendicular to each of the first direction DR1 and the second direction DR2.

The inkjet head 100 may discharge the droplet DP onto the target substrate SUB disposed on the stage ST. The inkjet head 100 may include a plurality of nozzles that discharge the droplet DP in a direction opposite to the third direction DR3 toward the target substrate SUB. The plurality of nozzles may be arranged along the first direction DR1.

The inkjet head 100 may move along the second direction DR2. That is, the inkjet head 100 may move in the second direction DR2 and discharge the droplet DP onto the target substrate SUB. Specifically, the inkjet head 100 may discharge the droplet DP in a stopped state and then move a predetermined distance in the second direction DR2 to discharge the droplet DP again in a stopped state. However, the present disclosure is not limited thereto, and the inkjet head 100 may move and repeatedly discharge the droplet DP.

The droplet DP discharged onto the target substrate SUB may be cured to form the pattern. The droplet DP discharged from the inkjet head 100 may form the pattern along the first direction DR1 and the second direction DR2.

The measurement part 200 may be spaced apart from the stage ST in the third direction DR3. The measurement part 200 may image (or, capture an image) at a focal position of the measurement part 200 in the direction opposite to the third direction DR3. That is, the image captured by the measurement part 200 may mean an image on the plane defined by the first direction DR1 and the second direction DR2. For example, the measurement part 200 may include a camera module.

In an embodiment, the measurement part 200 may detect the droplet DP discharged onto the target substrate SUB. In addition, the measurement part 200 may image the droplet DP on the target substrate SUB. That is, the measurement part 200 may capture an image of the droplet DP on the plane.

The correction part 300 may measure a distance between the droplet DP and the measurement part 200 based on the image of the droplet DP captured by the measurement part 200. In this case, the distance between the droplet DP and the measurement part 200 may mean a length in the third direction DR3 from the droplet DP to the measurement part 200. Since the upper surface of the target substrate SUB is not flat, the distance from the droplet DP to the measurement part 200 may vary according to a position where the droplet DP is seated on the target substrate SUB.

In addition, the correction part 300 may correct an area imaged by the measurement part 200 to an actual area of the droplet DP. Since the distance from the droplet DP to the measurement part 200 varies, the droplet DP may deviate from the focal position of the measurement part 200. In this case, an image of the droplet DP may be blurry, and an error may occur between the imaged area of the droplet DP and the actual area of the droplet DP. That is, the imaged area of the droplet DP may vary according to the distance from the droplet DP to the measurement part 200. The correction part 300 may correct the error between the imaged area of the droplet DP and the actual area of the droplet DP.

The control part 400 may control the focal position of the measurement part 200. Specifically, the control part 400 may control the focal position of the measurement part 200 based on the distance between the droplet DP and the measurement part 200. Accordingly, even when a type, a seating position, or the like of the droplet DP discharged on the target substrate SUB vary, the focal position of the measurement part 200 may be adjusted.

In FIG. 1, the measurement part 200, the correction part 300, and the control part 400 are illustrated as having separate configurations, but the present disclosure is not limited thereto. Alternatively, the measurement part 200, the correction part 300, and the control part 400 may have one configuration or two configurations.

Figure 2:
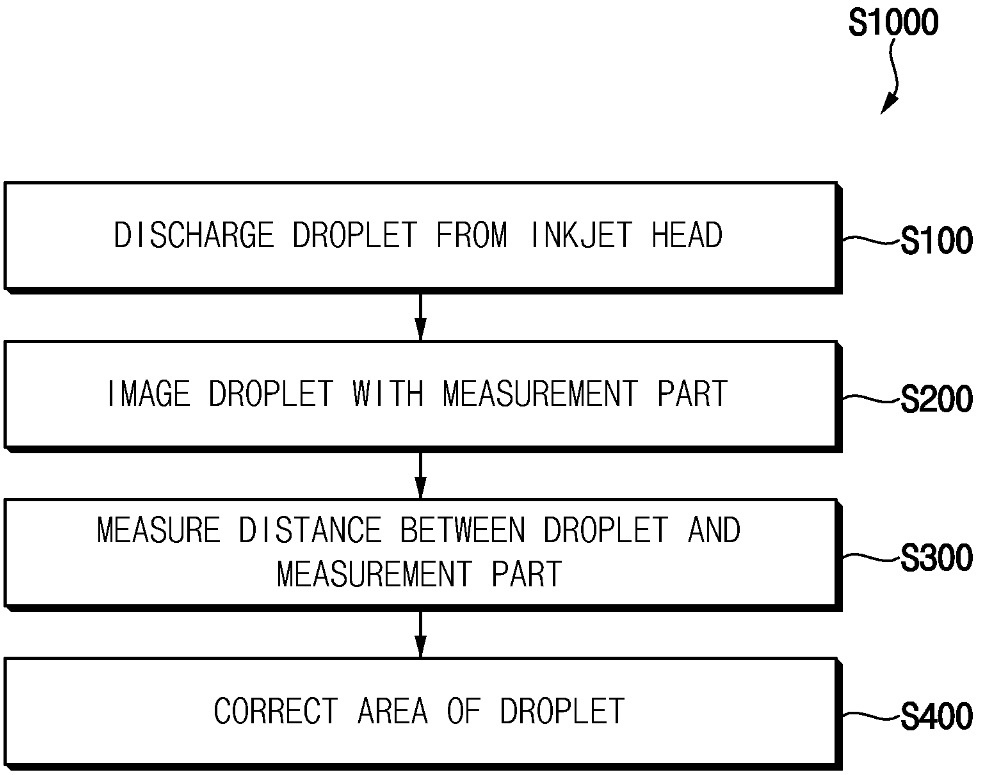
FIG. 2 is a flowchart of a method of measuring a droplet according to an embodiment of the present disclosure.

FIG. 2 is a flowchart of a method of measuring a droplet according to an embodiment of the present disclosure. FIGS. 3 to 10 are views for explaining the method of measuring the droplet of FIG. 2.

A method (S1000) of measuring a droplet described with reference to FIGS. 2 to 10 may be performed by the droplet measurement system 1000 described with reference to FIG. 1. That is, the droplet measurement system 1000 may use the method S1000 of measuring the droplet described with reference to FIGS. 2 to 10. Therefore, redundant descriptions will be omitted or simplified.

Figure 3:
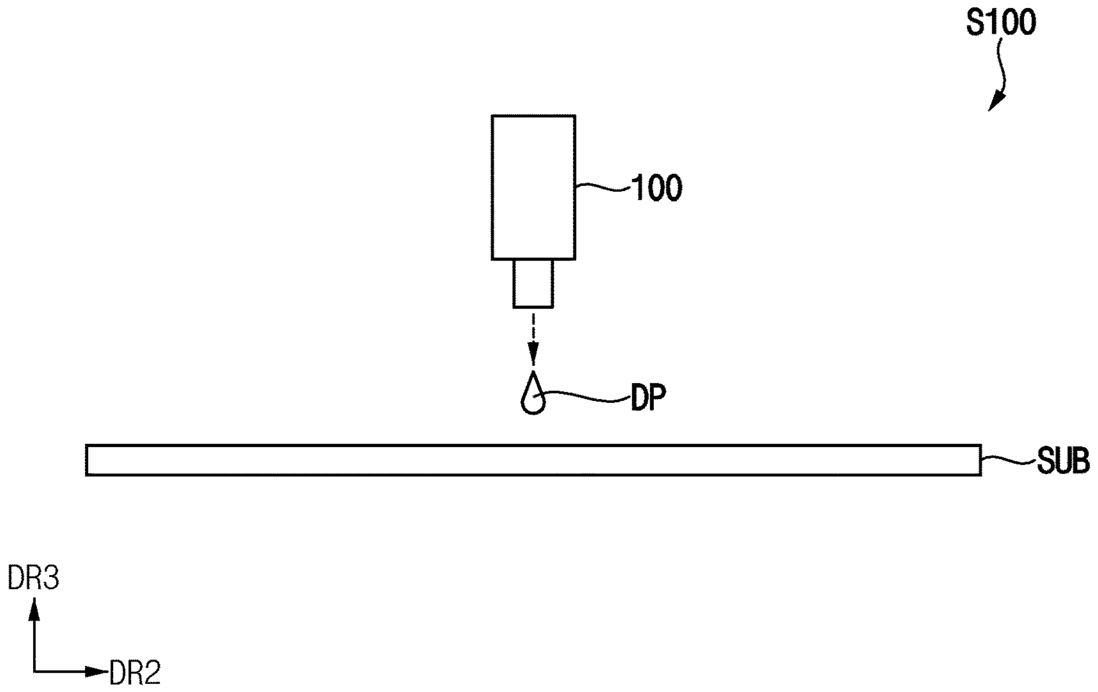
FIGS. 3, 4, 5, 6, 7, 8, 9, and 10 are views for explaining the method of measuring the droplet of FIG. 2.

Referring to FIGS. 2 and 3, in the method (S1000) of measuring the droplet, the inkjet head 100 may discharge the droplet DP onto the target substrate SUB (S100). The droplet DP may be discharged from the inkjet head 100 in the direction opposite to the third direction DR3, and may be seated on the target substrate SUB.

Figure 4:
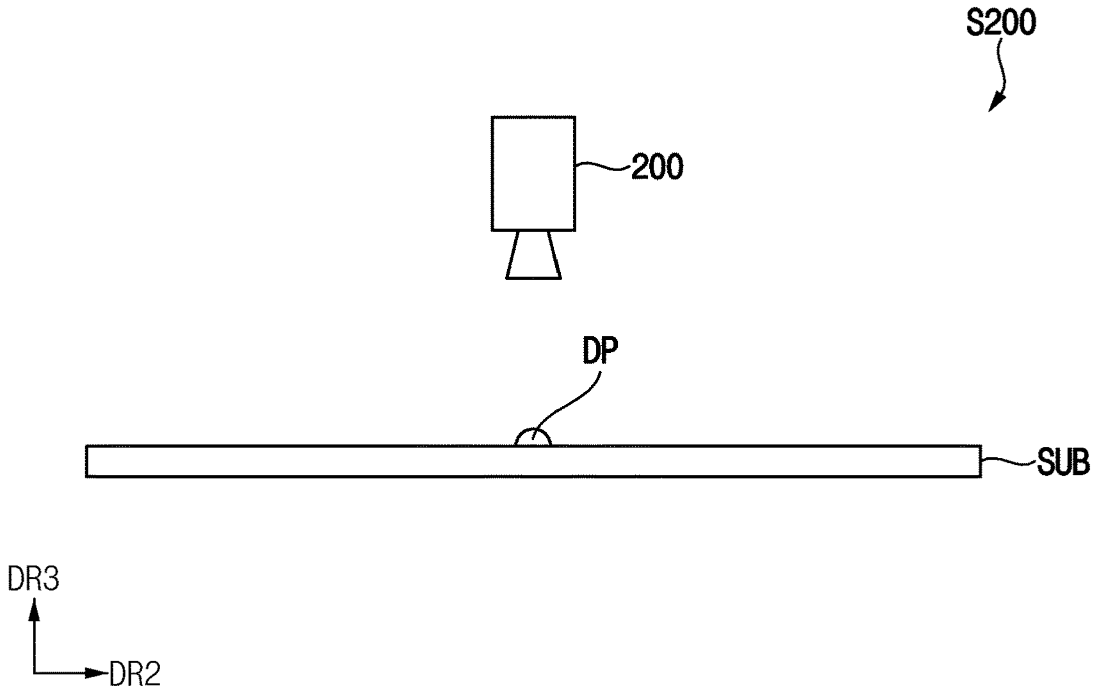

Referring to FIGS. 2 and 4, in the method (S1000) of measuring the droplet, the measurement part 200 may image the droplet DP on the target substrate SUB (S200). The measurement part 200 may be spaced apart from the droplet DP in the third direction DR3. That is, the measurement part 200 may capture an image of the droplet DP viewed from the direction opposite to the third direction DR3.

Referring to FIGS. 1, 2, 5, 6, 7, 8, 9, and 10, in the method (S1000) of measuring the droplet, the correction part 300 may measure the distance between the droplet DP and the measurement part 200 (S300).

In this case, the correction part 300 may compare a first image IM1, which is a captured image of the droplet DP, and a second image IM2, which is a reference image of the droplet DP. Here, the first image IM1 may be an image of the droplet DP captured by the measurement part 200, and the second image IM2 may be an image of the droplet DP captured by the measurement part 200 at the focal position of the measurement part 200.

For example, if the first image IM1 is an image in which the droplet DP deviates from the focal position is captured, the first image IM1 may be an out-of-focus image, and the second image IM2 may be an in-focus image. That is, the first image IM1 may be a relatively blurry image. For another example, if the first image IM1 is an image in which the droplet DP at the focal position is captured, each of the first image IM1 and the second image IM2 may be an in-focus image.

In an embodiment, in the measuring of the distance between the droplet DP and the measurement part 200 (S300), the correction part 300 may measure an area of the first image IM1 (S310). In this case, the area of the first image IM1 may be compared with an area of the second image IM2 (see FIG. 6).

When comparing the area of the first image IM1 with the area of the second image IM2, the area of the first image IM1 may be different from or equal to the area of the second image IM2. For example, if the droplet DP deviates from the focal position in a direction closer to the measurement part 200, the area of the first image IM1 may be larger than the area of the second image IM2. For another example, if the droplet DP deviates from the focal position in a direction away from the measurement part 200, the area of the first image IM1 may be smaller than the area of the second image IM2. For still another example, if the droplet DP does not deviate from the focal position, the area of the first image IM1 may be equal to the area of the second image IM2.

In an embodiment, in the measuring of the distance between the droplet DP and the measurement part 200 (S300), the correction part 300 may measure a distance in which the droplet DP deviates from the focal position of the measurement part 200 (S320). In this case, a grayscale change of a first edge part EP1 of the first image IM1 may be determined. In addition, the grayscale change of the first edge part EP1 of the first image IM1 may be compared with a grayscale change of a second edge part EP2 of the second image IM2.

When comparing the grayscale change of the first edge part EP1 of the first image IM1 with the grayscale change of the second edge part EP2 of the second image IM2, the first edge part EP1 of the first image IM1 may have a first width WD1 of the grayscale change, and the second edge part EP2 of the second image IM2 may have a second width WD2 of the grayscale change. The first width WD1 of the grayscale change may be greater than or equal to the second width WD2 of the grayscale change.

For example, if the droplet DP deviates from the focal position of the measurement part 200, the first image IM1 may have a relatively blurry image, and thus the first width WD1 of the grayscale change may be greater than the second width WD2 of the grayscale change. In addition, as the droplet DP deviates from the focal position of the measurement part 200, the first width WD1 of the grayscale change of the first edge part EP1 of the first image IM1 may increase. That is, the first width WD1 of the grayscale change of the first edge part EP1 may increase as the droplet DP deviates from the focal position in the direction closer to the measurement part 200 (e.g., a (−) direction of a horizontal axis of FIG. 8) or the direction away from the measurement part 200 (e.g., a (+) direction of the horizontal axis of FIG. 8).

For another example, if the droplet DP does not deviate from the focal position of the measurement part 200, the first width WD1 of the grayscale change may be equal to the second width WD2 of the grayscale change.

Figure 7:
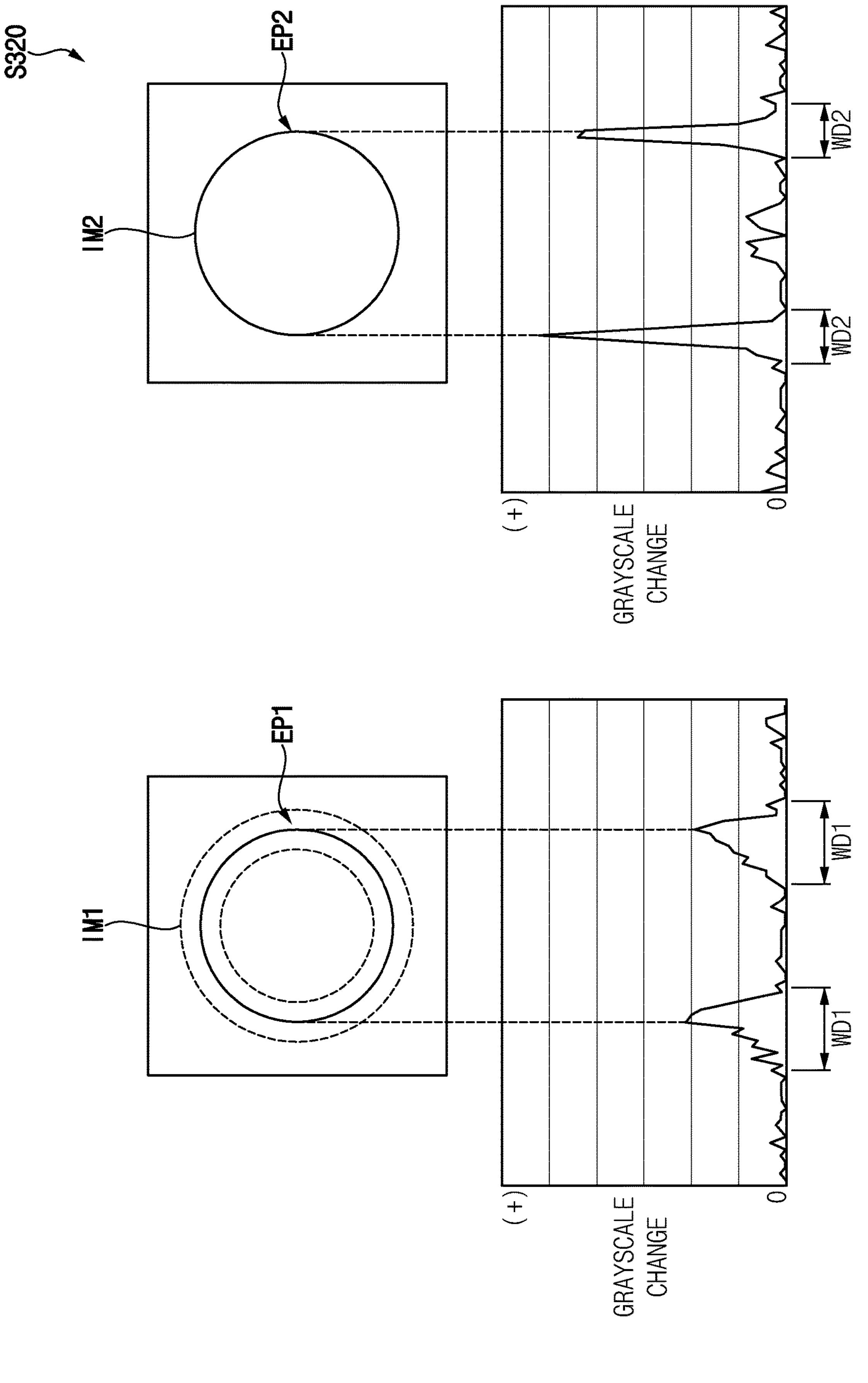
Figure 8:
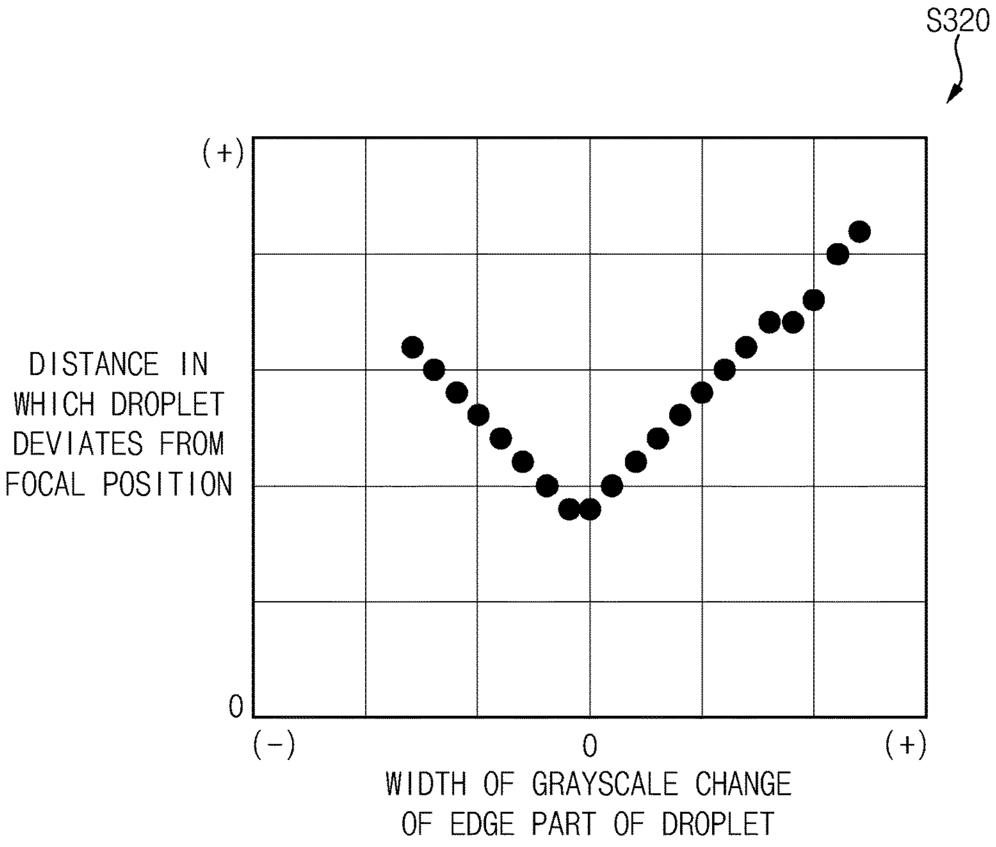

That is, the distance in which the droplet DP deviates from the focal position of the measurement part 200 may be measured according to the first width WD1 of the grayscale change of the first edge part EP1 of the first image IM1 (see FIGS. 7 and 8).

In an embodiment, in the measuring of the distance between the droplet DP and the measurement part 200 (S300), the correction part 300 may measure a direction in which the droplet DP deviates from the focal position of the measurement part 200 (S330). In this case, a grayscale of a first feature point FP1 of the first image IM1 may be determined. In addition, the grayscale of the first feature point FP1 of the first image IM1 may be compared with a grayscale of a second feature point FP2 of the second image IM2.

When comparing the grayscale of the first feature point FP1 of the first image IM1 with the grayscale of the second feature point FP2 of the second image IM2, a grayscale value of the first feature point FP1 may be different from or equal to a grayscale value of the second feature point FP2. For example, if the droplet DP deviates from the focal position, the grayscale value of the first feature point FP1 may be smaller than the grayscale value of the second feature point FP2. For another example, if the droplet DP does not deviate from the focal position, the grayscale value of the first feature point FP1 may be equal to the grayscale value of the second feature point FP2.

The first feature point FP1 and the second feature point FP2 may be parts where a grayscale of the first image IM1 is compared with a grayscale of the second image IM2. For example, the first feature point FP1 may be a part of the first edge part EP1 of the first image IM1, and the second feature point FP2 may be a part of the second edge part EP2 of the second image IM2. For another example, the first feature point FP1 may be a part of a central part of the first image IM1, and the second feature point FP2 may be a part of a central part of the second image IM2. However, the present disclosure is not limited thereto, and the first feature point FP1 and the second feature point FP2 may be parts where a grayscale difference between the first image IM1 and the second image IM2 appears.

In an embodiment, when comparing the grayscale of the first feature point FP1 of the first image IM1 with the grayscale of the second feature point FP2 of the second image IM2, spherical aberration of lens included in the measurement part 200 may be used.

Specifically, the grayscale of the first feature point FP1 when the droplet DP deviates from the focal position in the direction closer to the measurement part 200 may be different from the grayscale of the first feature point FP1 when the droplet DP deviates from the focal position in the direction away from the measurement part 200. In other words, even if a distance in which the droplet DP deviates from the focal position in the direction closer to the measurement part 200 and a distance in which the droplet DP deviates from the focal position in the direction away from the measurement part 200 have a same value, the grayscale of the first feature point FP1 may have different values.

Figure 9:
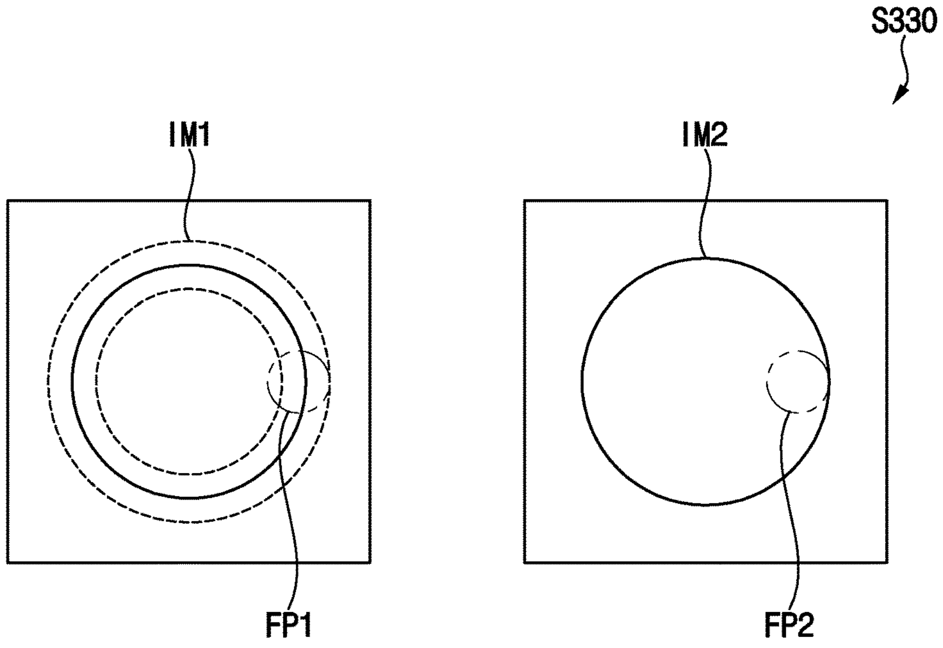
Figure 10:
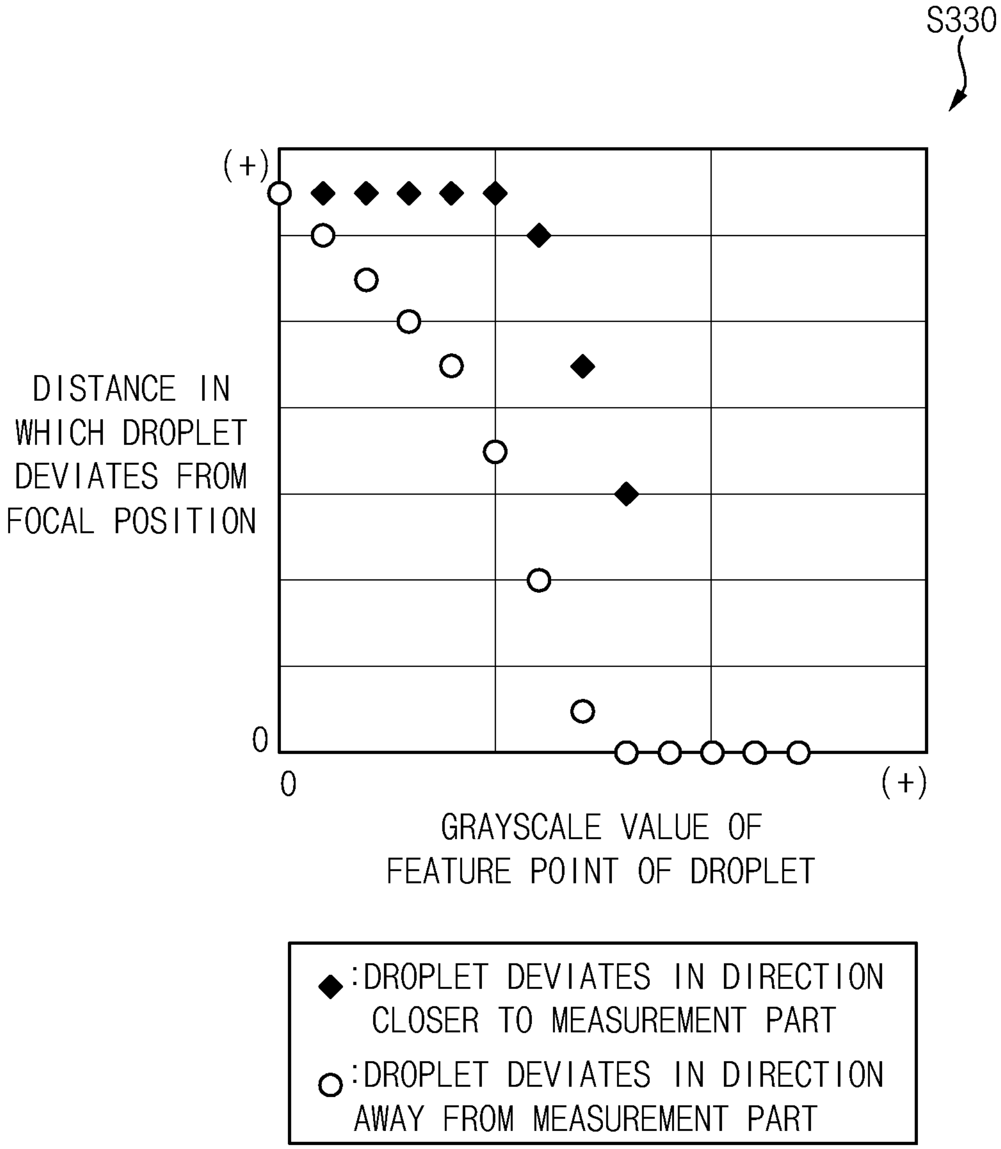

That is, according to the grayscale of the first feature point FP1 of the first image IM1, the direction in which the droplet DP deviates from the focal position of the measurement part 200 may be measured (see FIGS. 9 and 10).

Figure 5:
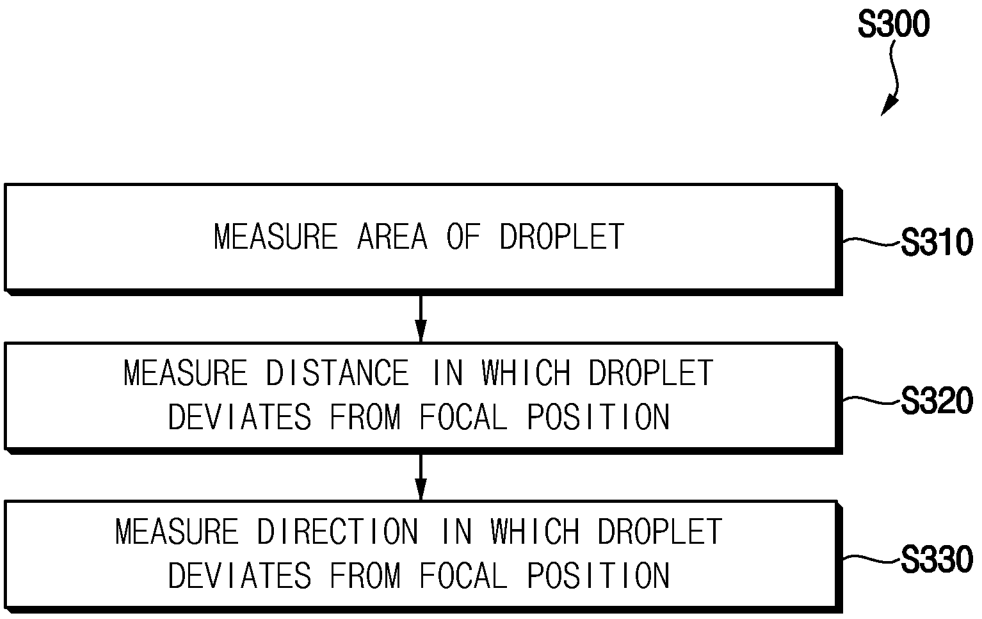
Figure 6:
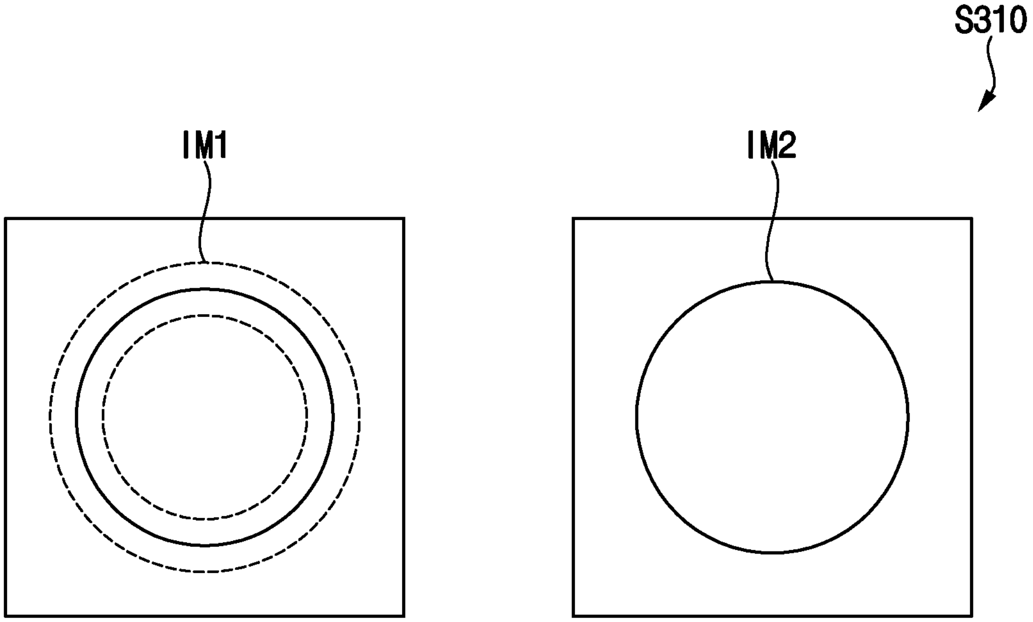

In FIG. 5, the measuring of the area of the droplet DP (S310), the measuring of the distance in which the droplet DP deviates from the focal position (S320), and the measuring of the direction in which the droplet DP deviates from the focal position (S330) are illustrated as being sequentially performed, but the present disclosure is not limited thereto. Alternatively, a sequence in which the measuring of the area of the droplet DP (S310), the measuring of the distance in which the droplet DP deviates from the focal position (S320), and the measuring of the direction in which the droplet DP deviates from the focal position (S330) are performed may be changed, or the measuring of the area of the droplet DP (S310), the measuring of the distance in which the droplet DP deviates from the focal position (S320), and the measuring of the direction in which the droplet DP deviates from the focal position (S330) may be performed simultaneously.

Referring back to FIGS. 1, 2, and 6, in the method (S1000) of measuring the droplet, the correction part 300 may correct an area of the droplet DP (S400).

The correction part 300 may correct the area of the first image IM1 to the actual area of the droplet DP. In other words, when the droplet DP deviates from the focal position, the correction part 300 may correct an error occurring between the area of the first image IM1 and the actual area of the droplet DP. In an embodiment, the area of the first image IM1 may be corrected to the actual area of the droplet DP based on the distance and the direction in which the droplet DP deviates from the focal position.

The control part 400 may feedback control the focal position of the measurement part 200. In an embodiment, the focal position of the measurement part 200 may be feedback controlled based on the area of the first image IM1, and the distance and the direction in which the droplet DP deviates from the focal position.

In addition, a discharge amount of the droplet DP may be evaluated based on the actual area of the droplet DP corrected by the correction part 300. That is, even if the error in the measurement area for the droplet DP deviates from the focal position occurs, it may be determined whether the droplet DP is uniformly discharged on the target substrate SUB based on the actual area of the droplet DP.

In the method (S1000) of measuring the droplet according to an embodiment of the present disclosure, the area of the droplet DP imaged by the measurement part 200 may be corrected to the actual area of the droplet DP based on the distance and the direction in which the droplet DP deviates from the focal position of the measurement part 200. Accordingly, even if the droplet DP deviates from the focal position of the measurement part 200, the error between the imaged area of the droplet DP and the actual area of the droplet DP may be automatically corrected, so that the discharge amount of the droplet DP may be evaluated based on the actual area of the droplet DP. Therefore, even if the upper surface of the target substrate SUB is not flat, the discharge amount of the droplet DP may be controlled to be uniform, so that a quality of a product including the droplet DP may be improved.

The present disclosure can be applied to a manufacturing process of various display devices. For example, the present disclosure is applicable to a manufacturing process of various display devices such as display devices for vehicles, ships and aircraft, portable communication devices, display devices for exhibition or information transmission, medical display devices, and the like.

The foregoing is illustrative of embodiments and is not to be construed as limiting thereof. Although embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A method of measuring a droplet, the method comprising:

discharging a droplet onto a substrate;

imaging the droplet with a measurement part spaced apart from the droplet in one direction;

measuring a distance between the droplet and the measurement part including, measuring a distance in which the droplet deviates from a focal position of the measurement part including determining a grayscale change of an edge part of a first image of the droplet imaged by the measurement part and the grayscale change of the edge part of the first image is compared with a grayscale change of an edge part of a second image of the droplet imaged by the measurement part at the focal position; and correcting an area of the droplet.

2. The method of claim 1, wherein as the droplet deviates from the focal position of the measurement part, a width of the grayscale change of the edge part of the first image increases.

3. The method of claim 1, wherein the measuring of the distance between the droplet and the measurement part further includes:

measuring a direction in which the droplet deviates from the focal position of the measurement part.

4. The method of claim 3, wherein the measuring of the direction in which the droplet deviates from the focal position of the measurement part includes:

determining a grayscale of a feature point of the first image of the droplet.

5. The method of claim 4, wherein in the determining of the grayscale of the feature point of the first image of the droplet, the grayscale of the feature point of the first image is compared with a grayscale of a feature point of the second image.

6. The method of claim 4, wherein the feature point is a part of the edge part of the first image.

7. The method of claim 4, wherein the feature point is a part of a central part of the first image.

8. The method of claim 3, wherein the measuring of the distance between the droplet and the measurement part further includes:

measuring an area of the first image of the droplet.

9. The method of claim 8, wherein in the measuring of the area of the first image of the droplet, the area of the first image is compared with an area of the second image.

10. The method of claim 3, wherein in the correcting of the area of the droplet, an area of the first image is corrected to an actual area of the droplet based on the distance in which the droplet deviates from the focal position of the measurement part and the direction in which the droplet deviates from the focal position of the measurement part.

11. The method of claim 10, further comprising:

evaluating a discharge amount of the droplet based on the actual area of the droplet.

12. The method of claim 3, further comprising:

feedback controlling the focal position of the measurement part based on the distance in which the droplet deviates from the focal position of the measurement part and the direction in which the droplet deviates from the focal position of the measurement part.

13. A droplet measurement system comprising:

an inkjet head that discharges a droplet onto a substrate;

a measurement part spaced apart from the droplet in one direction and that images the droplet; and a correction part that measures a distance between the droplet and the measurement part and corrects an area of the droplet imaged by the measurement part, wherein the correction part measures the distance between the droplet and the measurement part based on the area of the droplet imaged by the measurement part, a distance in which the droplet deviates from a focal position of the measurement part, and a direction in which the droplet deviates from the focal position of the measurement part.

14. The droplet measurement system of claim 13, wherein the correction part measures the distance in which the droplet deviates from the focal position of the measurement part based on a grayscale change of an edge part of the droplet imaged by the measurement part.

15. The droplet measurement system of claim 13, wherein the correction part measures the direction in which the droplet deviates from the focal position of the measurement part based on a grayscale of a feature point of the droplet imaged by the measurement part.

16. The droplet measurement system of claim 13, further comprising:

a control part that feedback controls the focal position of the measurement part based on the distance between the droplet and the measurement part.

* * * * *